July 3, 1956     W. HAENDELER     2,753,044
DEVICE FOR EXTRUDING THIN-WALLED TUBES
Filed May 22, 1952
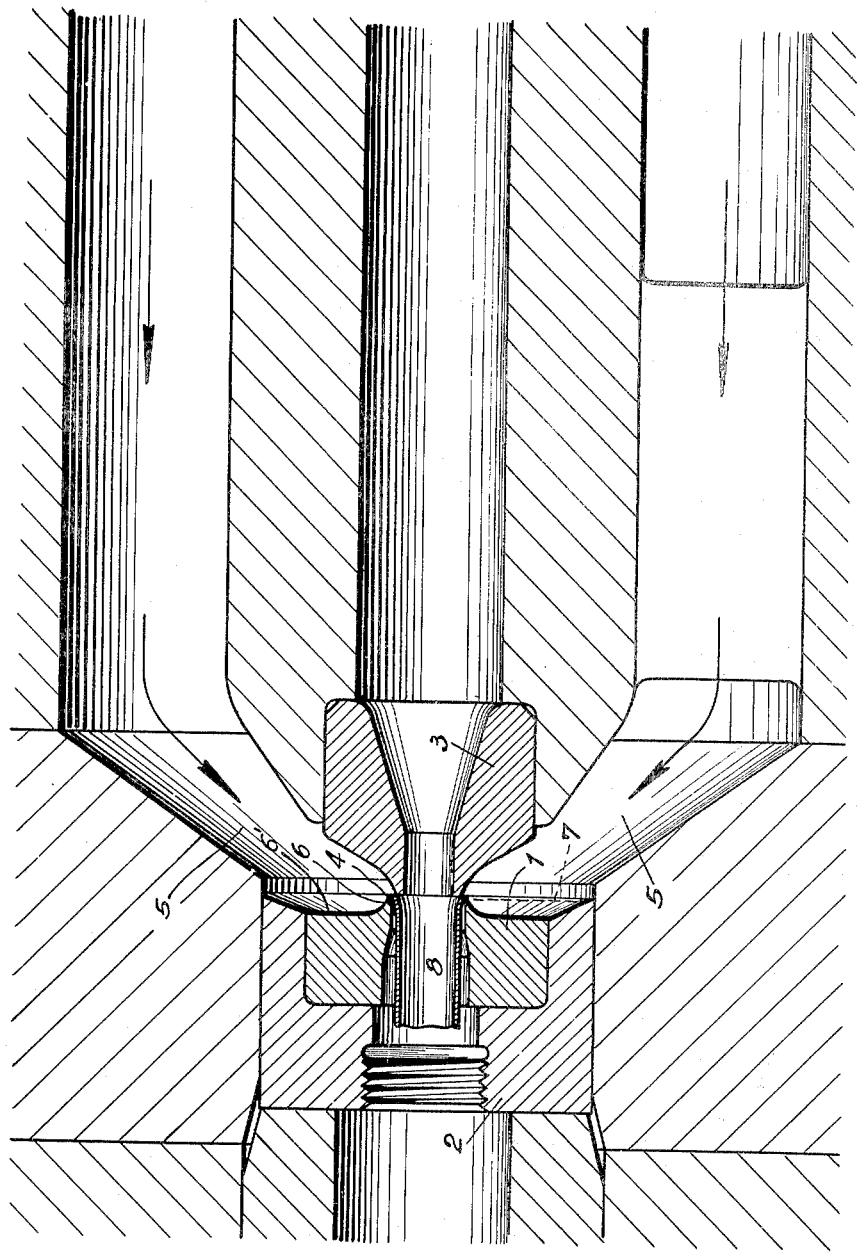
*INVENTOR*
WALTER HAENDELER
ATTORNEYS

United States Patent Office 2,753,044
Patented July 3, 1956

---

2,753,044

DEVICE FOR EXTRUDING THIN-WALLED TUBES

Walter Haendeler, Dusseldorf, Germany, assignor to Schloemann Aktiengesellschaft, Dusseldorf, Germany Application May 22, 1952, Serial No. 289,393

Claims priority, application Germany June 5, 1951

5 Claims. (Cl. 207—4)

The invention relates to tools for pressing for manufacturing thin-walled tubes preferably of light metal, although these new tools may also be employed in presses for the treatment of lead or synthetic substances. These tools may also be employed in die-casting machines. But these tools are primarily intended for use in cable sheath presses for the treatment of aluminium or other light metals.

Unfavourable flow or friction conditions in the spaces disposed in front of the moulding annular gap formed by the die and the mandrel make the manufacture of particularly thin-walled tubes impossible.

The flow and friction conditions during the admission of the material to the moulding annular cross section are improved, according to the invention, by the fact that the matrix or die has an annular projection of which the section is preferably acute-angled and which forms one boundary of the annular cross section moulding the tube or cable sheath, the other boundary thereof being formed by the mandrel in a known manner. The end of the mandrel is preferably made of such dimensions and so adjusted relatively to the die that the mandrel end, of which the external diameter is maller than the internal diameter of the die, projects up to the plane defined by the edge of the die, or nearly up to this plane.

Tools according to the invention, including the new die, are illustrated in the working position, in longitudinal section, in the accompanying drawing.

The matrix 1 is inserted in the holder 2. The end of the mandrel 3 and the edge 4 of the matrix 1 form the moulding annular cross section or extrusion orifice through which the material admitted through the channel 5 is forced and is thus pressed into the form of a tube 8. The channel 5, together with the surfaces of the mandrel and matrix, defines an extrusion chamber having walls which taper toward the extrusion orifice in such manner that substantially all of the metal in the extrusion chamber in approaching the extrusion orifice flows only in a direction having a substantial component axially of the matrix. The surface of mandrel 3 is concaved inwardly toward the extrusion orifice to guide metal toward the orifice. The external diameter of the end of the mandrel is smaller than the internal diameter of the matrix. The end of the mandrel projects up to the plane defined by the edge 4 of the matrix. However, it is also possible for the end of the mandrel to project up to the plane bounded by the edge 4 of the matrix. The edge 4 has become a knife-like blade because of the acute-angled annular projection or rim 6. Annular projection 6 protrudes axially toward the mandrel from the plane face 6' of the matrix and defines, together with the mandrel, an annular extrusion orifice for the metal. In contradistinction thereto, in constructions known heretofore the matrix edge is formed by surfaces meeting at right angles (see the broken line 7 in the drawing). In the last-mentioned known construction, the stream of material has to overcome the friction against the end surface 7 of the matrix. This resistance is very great; it prevents the walls of the tubes from being made thin, in spite of all efforts to achieve this object, since normal presses are in most cases not designed for such great pressures as would be necessary for manufacturing extremely thin-walled tubes.

Tests have shown that by means of tools according to the invention it is possible to work with presses producing smaller pressures, and more especially to manufacture tubes having particularly thin walls.

I claim:

1. A tool for the extrusion of thin-walled pipes of light metal, particularly for jacketing of cables, comprising an extrusion chamber, a mandrel and a matrix, said matrix having a relatively narrow annular rim portion protruding axially toward said mandrel, said rim portion and said mandrel together defining an annular extrusion orifice, said extrusion chamber having walls partially defined by the cooperating surfaces of said mandrel and matrix, said walls converging generally toward said extrusion orifice in such manner that during the extrusion operation substantially all of the metal in said extrusion chamber in approaching said extrusion orifice flows only in a direction having a substantial component of flow axially of said mandrel and matrix.

2. A tool as defined in claim 1, in which said rim portion protrudes toward said mandrel to define a sharp blade-like edge.

3. A tool as defined in claim 1, in which said matrix has a substantially plane face lying in a plane substantially perpendicular to the longitudinal axis of said matrix, and said annular rim portion protrudes axially from said plane face toward said mandrel.

4. A tool as defined in claim 3, in which the surface of said matrix between said plane face and said rim portion is tapered.

5. A tool as defined in claim 1, in which the surface of said mandrel is curved concavely toward said extrusion orifice to guide metal toward said orifice.

References Cited in the file of this patent

UNITED STATES PATENTS

| 346,563 | Robertson | Aug. 3, 1886 |
| 451,960 | Tracy | May 12, 1891 |
| 1,856,483 | Judge et al. | May 3, 1932 |
| 2,085,977 | Hill et al. | July 6, 1937 |
| 2,142,526 | Norris | Jan. 3, 1939 |

FOREIGN PATENTS

| 73 | Great Britain | 1897 |
| 22,780 | Great Britain | Dec. 13, 1900 |
| 24,948 | Great Britain | Nov. 6, 1906 |